United States Patent
Snell

(10) Patent No.: US 6,799,488 B2
(45) Date of Patent: Oct. 5, 2004

(54) THUMB-ACCESSIBLE CONTROL HOUSING FOR STEERING DEVICE

(75) Inventor: David Ralph Snell, Kirkland, WA (US)

(73) Assignee: David R. Snell, Kirkland, WA (US)

( * ) Notice: Subject to any disclaimer, the term of this patent is extended or adjusted under 35 U.S.C. 154(b) by 0 days.

(21) Appl. No.: 10/170,265

(22) Filed: Jun. 12, 2002

(65) Prior Publication Data

US 2003/0230161 A1 Dec. 18, 2003

(51) Int. Cl.⁷ .................................................. B62D 1/04
(52) U.S. Cl. ........................... 74/552; 180/170; 180/315
(58) Field of Search ............................... 74/551.8, 552, 74/484 R, 335; 180/170, 315, 336, 335; 280/88

(56) References Cited

U.S. PATENT DOCUMENTS

| | | | |
|---|---|---|---|
| 4,077,487 A | | 3/1978 | Misinchuk |
| 4,496,018 A | | 1/1985 | Hsin-Min |
| 4,542,897 A | * | 9/1985 | Melton et al. ............... 436/7 |
| 4,722,416 A | | 2/1988 | Ahnafield |
| 5,335,743 A | | 8/1994 | Gillbrand et al. |
| 5,365,803 A | | 11/1994 | Kelley et al. |
| 5,442,942 A | * | 8/1995 | Geisler ...................... 70/209 |
| 5,520,066 A | | 5/1996 | Tueri |
| 5,605,643 A | | 2/1997 | Reece |
| 5,704,707 A | * | 1/1998 | Gebelein et al. ............ 362/106 |
| 5,855,144 A | | 1/1999 | Parada |
| 5,949,149 A | | 9/1999 | Shitanaka et al. |
| 6,226,570 B1 | | 5/2001 | Hahn |
| 6,327,932 B1 | | 12/2001 | Onodera et al. |
| 6,349,616 B1 | | 2/2002 | Onodera et al. |
| 6,595,031 B2 | * | 7/2003 | Wilson et al. ............. 74/551.8 |
| 2001/0032743 A1 | | 10/2001 | Kamen et al. |
| 2001/0054326 A1 | | 12/2001 | Onodera et al. |
| 2002/0035889 A1 | | 3/2002 | Lorenz |

FOREIGN PATENT DOCUMENTS

JP        04011567 A  *  1/1992  ............ B62D/1/04

OTHER PUBLICATIONS

Access-able.org (anonymous), Driving Controls, web page, 3 pages long, see pages 1–2, http://www.accessable.org/rooms/garage/driving-controls.shtml.

Drivingaids.com, (anonymous), Driving Freedom, web page, 2 pages long, see page 1, http://www.drivingaids.com/DADC500.htm.

* cited by examiner

Primary Examiner—David A. Bucci
Assistant Examiner—Bradley J. Van Pelt

(57) ABSTRACT

A control housing body (10) containing a cavity (12) of sufficient size to allow entry and movement by a human thumb, and capable of housing a number of controls (14, 16). Body (10) is inserted under a covering grip (33) that is connected in line with a surface grip (32) of a rotating steering device (31). Dial control (14) is provided to set a scalar variable such as vehicular speed at a constant number. A thumb rest (13) and a control guard (17) inhibit the thumb from slipping downwards and unintentionally activating a contracting control (16) that can be actuated by the contracting movement of a human thumb. A sliding cover (40) can be alternately positioned over cavity (12) or inside retraction slot (46). A pivoting pin (22) and pivoting rotator (24) allow the control housing body to rotate around the axis between two pivot holes (26) and (28). Signal-conducting wires (35) pass through rotator (24), through right pivot hole (28) and then through surface grip (32), spoke (34), and steering column (36), transmitting signals to other devices such as brakes, throttles and cruise controls. When control housing is not in use, magnetized members (38a) and (38b) cause a rotation to hide surface grip (32) under covering grip (33).

20 Claims, 3 Drawing Sheets

THUMB-ACCESSIBLE CONTROL HOUSING FOR STEERING DEVICE

BACKGROUND—FIELD OF THE INVENTION

This invention relates to the housing of controls on rotational steering devices such as steering wheels.

BACKGROUND—DESCRIPTION OF PRIOR ART

Perhaps the best-known hand control is the 'cruise control' device, which is usually operated by a lever mounted on the steering column. This device controls the throttle in such manner that it strives to maintain the speed of the vehicle at the same vehicular speed that is measured at the instant of actuation of the cruise control device. In some cases, the device may also incorporate controls for deceleration or acceleration of the vehicle. Cruise control devices are nice to have, but they do carry the disadvantage of requiring the driver to move a hand off the steering wheel, and furthermore they usually cause the driver's eyes to glance away from the road.

Of the various patents that place controls on the steering wheel pad, U.S. Pat. No. 5,335,743 to Gillbrand (1991) is noteworthy. It places controls a few centimeters below one thumb. These controls regulate the throttle, operate the cruise control, and perform upward and downward gear shifting. However, this invention does not include a braking control. The thumb must reach towards and find the controls before actuating them, and therefore this invention is slow to operate. The driver may even need to look down to find the controls, forcing the driver to take his or her eye off the road. Finally, the controls are unacceptably exposed to accidental actuation by the careless movement of arms, hands and fingers.

U.S. Pat. No. 4,496,018 to Hsin-Min (1983) discloses a brake control function that is operated by moving the steering wheel up or down. However, this device is awkward to operate, requiring full arm movement. Furthermore it would be difficult to simultaneously turn the wheel to steer, while at the same time pushing the wheel down to initiate braking.

U.S. Pat. No. 4,077,487 to Misinchuk (1976) discloses a manual brake control located on the spoke of the steering wheel near the rim, in position to be operated by the right thumb. However, this device places the braking control well below the recommended "2 o'clock" position for the right hand. Furthermore the control is not operated by a simple contraction of the thumb. Most drivers would not keep their thumbs over the brake control at all times, because that would be uncomfortable for them. Rather, some time would be required for driver to extend a thumb to the braking control, find it by either feeling it or looking down for it, and then push it to actuate the brakes. Therefore this invention is awkward to operate, and too slow to be suitable for emergency braking.

U.S. Pat. No. 6,327,932 to Onodera (2002), also described in U.S. patent application Publication "US 2001/0054326 A1" by Onodera, actually places controls on the steering wheel rim, at the normal position of the hands when driving (often called the "10-o'clock-2-o'clock" position.) However these controls are dial-type controls that are designed to control audio system functions. No allowance is made for a brake control, and there is no assurance that the thumb will maintain its position over the controls as the wheel is being turned. Furthermore, these controls are exposed to the open front side of the steering wheel rim, inviting accidental actuation by an unintended motion of the driver's hand. Therefore it would be unwise to allow these controls to operate any device of a serious nature. U.S. Pat. No. 5,855,144 to Parada attempts something similar to Onodera's invention, and the same criticisms apply.

Various joystick-like control devices have been invented to help handicapped people drive, steer and brake an automobile. U.S. Pat. No. 4,722,416 to Ahnafield (1986) discloses a joystick vehicle control device that is capable of controlling both braking and vehicular speed. Joystick-like devices have some merit, but they are not suitable for mounting on a steering wheel. Many drivers will find the 'learning curve' for these radically different steering devices to be too steep. The risk of driver error would be high because of initial unfamiliarity with these devices, and furthermore the joystick would be exposed to accidental actuation by passengers (most drivers are right-handed, so the joystick would usually be placed towards the center of the car).

Finally, various manual hand-operated levers or turning knobs have been invented and/or marketed before, most of which are normally used only by handicapped people. They can most effectively be found by performing a search for "paraplegic brak*" or "paraplegic steer*" on various search engines, such as AltaVista.com. But the devices I have located in this manner are not safely mounted under the thumb, and are slow and cumbersome to operate. Furthermore their exposure on the front of the steering wheel invites accidental actuation, with potentially disastrous consequences.

OBJECTS AND ADVANTAGES

Accordingly, some objects and advantages of my control housing are:

a) A thumb-operated control (for example, a thumb-operated electronic brake) can be more quickly actuated than a foot-operated device. With a foot brake, a driver first has to take the right foot off the gas pedal, move it leftwards, then push down on the brake pedal. A thumb-operated brake would require only a quick thumb motion. I have read that it takes an average driver one-half second to see the brake lights of the vehicle he is following, move the right foot from the accelerator to the brake, and depress the pedal. At 60 mph, the car has already traveled 44 feet. If this time could be cut in half by my invention, that 22 feet could mean the difference between death and a completely healthy life. Wherever my control housing is used to house a thumb-operated braking device, the frequency and destructiveness of vehicle collisions will be greatly reduced. If my control housing achieves wide circulation, it could save thousands of lives and reduce the seriousness of millions of injuries.

Automotive technologies exist that use computerization and electronics to provide for braking and operate the throttle. Thumb-sized controls can be manufactured that utilize these technologies, and these controls can be placed within my control housing. It is important to stress that my invention is a housing for controls, not a set of electronic components. Therefore these electronic automotive technologies are to be regarded as symbiotic forms, not as competitors to my control housing.

b) Our hands have superior dexterity to our legs and feet, so when using a thumb-operated control there is less chance of making a physical mistake. An example of such a mistake is hitting the brake pedal with the side of the right foot, as it moves leftwards after lifting up off the gas pedal.

Furthermore, when drivers are confronted by a sudden surprising situation that could lead to an accident, some drivers "freeze up" at least momentarily and don't brake in time. Part of this is the "deer in the headlights" panic effect; but perhaps also it's because in the course of our everyday lives we are more accustomed to reacting with our hands than with our feet. In this case, I theorize that it would be easier for the driver's brain to overcome this freeze-up effect if the task it must perform is to send a simple signal to the thumb to contract, rather than a more complex 3-step foot motion. Therefore, a number of people can be expected to initiate their reaction more quickly when operating a control with their hand.

I recall an incident from my personal life when I was a young man 17 years of age. Two people suddenly appeared in front of my car, and I was so surprised that my foot momentarily hit the gas pedal rather than hitting the brake. I think I was instinctively initiating the braking sequence, without first taking my foot off the gas pedal. Fortunately nobody was hurt. If thumb-actuated brakes are used, this type of situation can be avoided.

c) If my control housing is used to house a throttle control, the driver won't have to keep his or her right foot over the gas pedal, and therefore can drive long distances without experiencing foot fatigue. The driver may still want to keep the right foot over the brake pedal, but even this can be avoided if my control housing also contains a brake control.

Alternatively, fatigue can be eliminated if the brakes are so designed as to be immediately accessible to a foot kept in a restful position. As it stands now, you can't really keep your foot over the brake pedal because it's so tiring to maintain that position.

d) This would be as good a time as any to disclose the main disadvantage I see in my invention: it might actually be too easy to operate the brakes. If the brakes can be activated by a simple thumb motion, a sudden stop could occur in an unexpected location such as the middle of a highway.

However, I have guarded against this in my invention in many ways: I have placed the brake control deep within the housing to make it difficult to accidentally actuate with a careless motion; I've inserted a control guard to inhibit the thumb from unintentionally actuating the brake control; the control cavity automatically turns away from the driver whenever he releases the thumb control; and the driver can at any time slide a cover over the cavity containing the controls. Furthermore, if the thumb does mistakenly actuate the brakes, the driver can instantly stop the braking action by merely relaxing his or her thumb. And lastly, my invention will still be very useful even if it contains only a throttle control.

e) Paraplegics will be able to operate a vehicle that utilizes my control housing, provided that the steering wheel ratio is calibrated in such a way that the steering wheel never turns so far that the driver has to release my control housing. This is best done with a "variable steering ratio" so that when the car slows down, little motion is required to turn the car. The wheel must turn more slowly at high speed, because if drivers were allowed to turn the car with little motion then, there would be an unacceptable risk of accidents.

f) My control housing is shaped so as to maintain the circular shape of the steering wheel's rim, which means the driver can turn the steering wheel with normal comfort.

g) My control housing will be immediately accessible to the driver for close to 99% of the time that the vehicle is being driven, even when the steering device is being moderately rotated by the hands. Only in the course of a sharp turn will it become temporarily inaccessible.

h) My control housing is normally located in the "2 o'clock position" of the steering wheel. This encourages drivers to maintain the normal "10 o'clock–2 o'clock" driving position, helping to ensure driver readiness.

i) When my control housing is used in conjunction with electronic "drive-by-wire" systems, and a thumb-operated control is used to actuate braking, the throttle can be programmed to be immediately cut whenever the brakes are actuated, and this will ensure faster braking.

j) My control housing can be made in a modular fashion: it can be removed from the steering device and replaced with a normal steering wheel section, or it can be replaced with a more advanced control housing.

k) A thumb-controlled brake would be a good backup system in case a foot slips off the brake pedal, or the brake pedal somehow malfunctions.

l) Because of all of the above reasons, driving will become a more enjoyable experience.

Further objects and advantages of my control housing will become apparent from a consideration of the drawings and ensuing description.

DRAWING FIGURES

Figure 1:
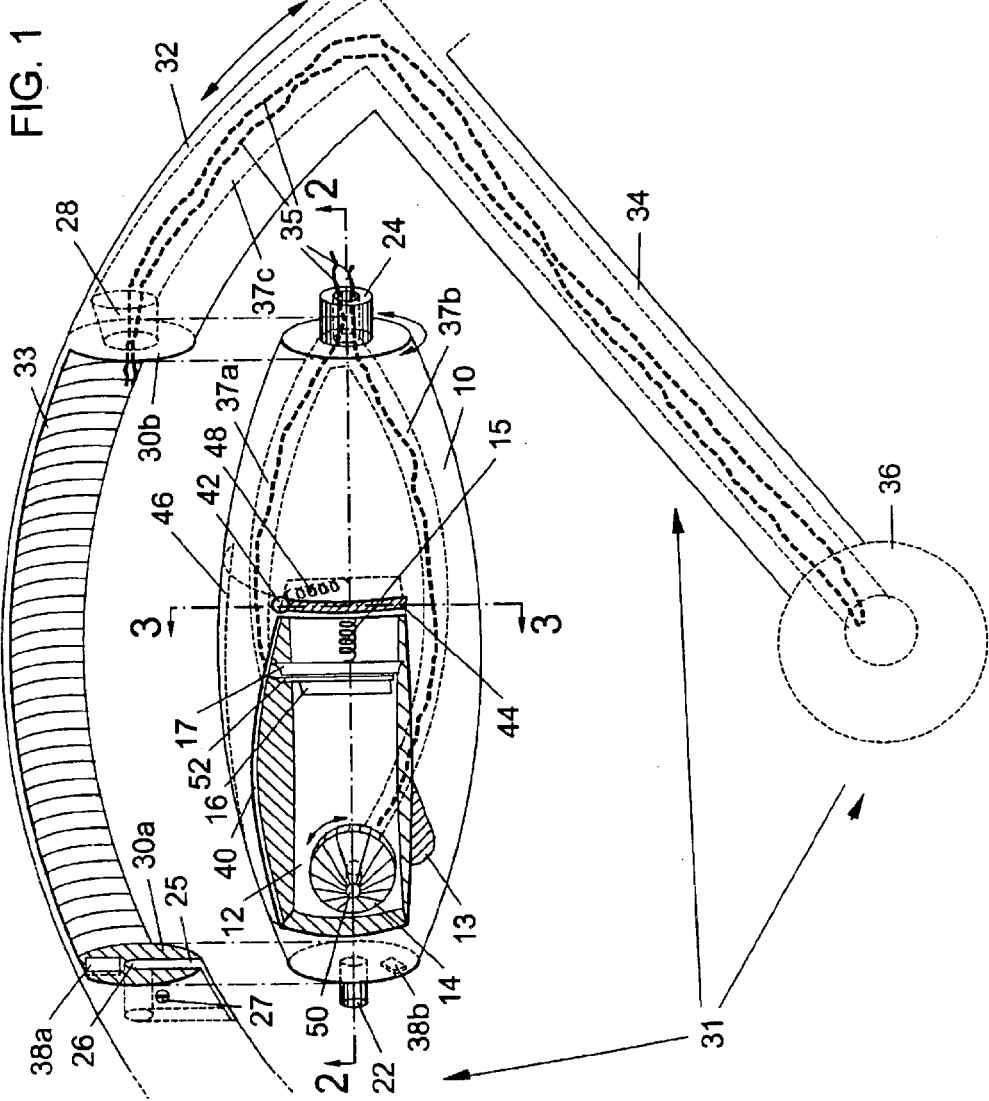
FIG. 1 shows a perspective view of my control housing, as the driver would see it after turning the steering wheel counterclockwise so that the control housing is at the top.
Figure 4:
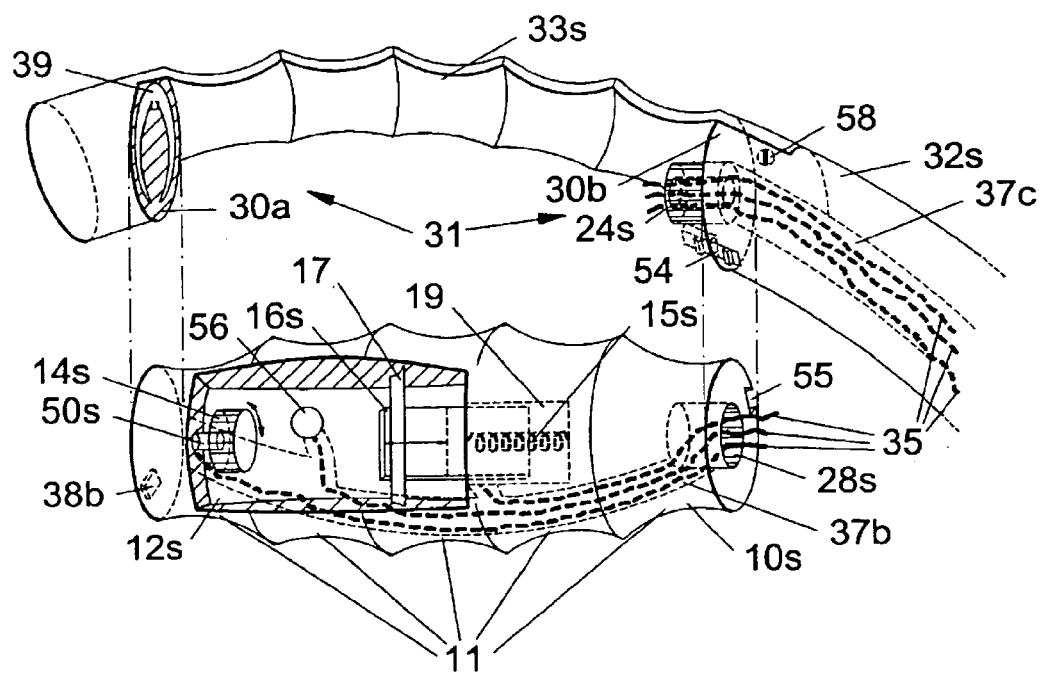
FIG. 4 is an alternative embodiment, from the same perspective used in FIG. 1.

For the sake of clarity, whenever I use the words "left" or "right" or "leftwards" or "rightwards", I am referring to the orientation shown in FIGS. 1 and 4.

REFERENCE NUMERALS IN DRAWINGS

Where I place a note "(s*)" below, that means that the alternative embodiment has a slightly different version of a corresponding part used in the preferred embodiment.

| | |
|---|---|
| 10 | body of housing (s*) |
| 11 | ergonomic grooves in body 10 |
| 12 | cavity inside body (s*) |
| 13 | thumb rest (s*) |
| 14 | control, preferably of dial type (s*) |
| 15 | control spring (s*) |
| 16 | contracting control, preferably a force-feedback lever type (s*) |
| 17 | control guard |
| 19 | control slot |
| 22 | left pivoting pin |
| 24 | right pivoting rotator with aperture (e.g. a hollow cylinder) (s*) |
| 25 | pin removal slot |
| 26 | left pivot hole (for pivoting pin 22) |
| 27 | pin screw |
| 28 | right pivot hole (for rotator 24) (s*) |
| 30a, 30b | slanted joints |
| 31 | rotating steering device, e.g. a steering wheel assembly |
| 32 | surface grip (of rotating steering device, e.g. a steering wheel rim) (s*) |
| 33 | covering grip (of steering device) (s*) |
| 34 | spoke (of steering device) |

-continued

| | |
|---|---|
| 35 | signal-conducting wires (e.g. electrical wires or optical cables) |
| 36 | steering column |
| 37a, 37b, 37c | conductor conduits |
| 38a, 38b | positioning magnetized members |
| 39 | positioning iron arc |
| 40 | sliding cover |
| 42 | cover knob |
| 44 | knob groove |
| 46 | retraction slot |
| 48 | cover spring |
| 50 | dial control pin (s*) |
| 52 | contracting control pin |
| 54 | position lock |
| 55 | position lock groove |
| 56 | additional button control |
| 58 | covering grip screw |
| 60 | hand |
| 62 | thumb |
| 64 | distal phalanx of thumb 62 (the outer bone of the thumb, and the flesh surrounding it) |
| 66 | proximal phalanx of thumb 62 (the inner bone of the thumb, and the flesh surrounding it) |
| 68 | palm of hand |

SUMMARY

A control housing comprises a somewhat rounded and elongated body, which is inserted into a section of a surface grip of a steering device, capable of rotating around the axis of its elongated body, with a cavity of sufficient size to allow at least partial entry and movement by a human thumb, and able to house at least one control in a manner that enables it to transmit signals for the purpose of operating external devices.

Figure 2:
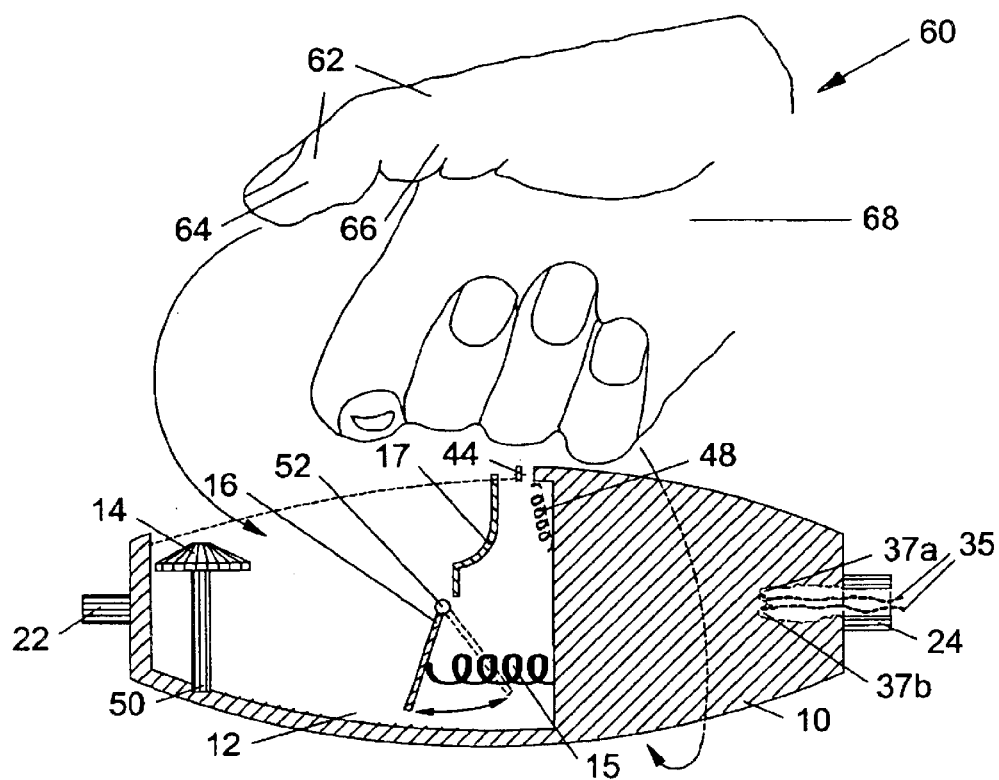
FIG. 2 is a side-view cross-section, showing my control housing with a human hand above it and in position to grip it.
Figure 3:
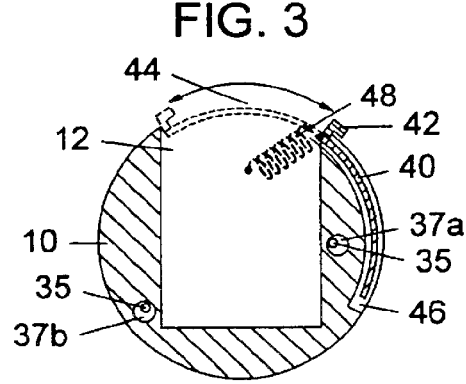
FIG. 3 shows an end-view cross-section, illustrating the positioning and movement of the sliding cover.

Description—FIGS. 1 to 3

A typical embodiment of the control housing of the present invention is illustrated in FIG. 1 (perspective overview) showing the control housing in conjunction with a steering device 31. Lightweight plastic is the preferred material for most of the components cited in this description. Exceptions to this preference are magnetized members, pins, screws, and springs, which are preferably made of metal. Plastics should be rigid, except for a covering grip 33 described below, which should be substantially flexible. For the purposes of this document, a "rotator" is defined as a cylinder or any shape that can fulfill the rotary function of a cylinder turning within a hole.

The control housing has a substantially elongated, preferably rounded body 10 about fifteen centimeters long. Inside body 10 is a cavity 12 about three centimeters wide, seven centimeters long and with a depth extending to about five millimeters of the side of body 10 opposite from cavity 12. Cavity 12 is of sufficient size to contain controls 14 and 16, and is large enough to allow at least partial entry and movement by a human thumb 62 extending from a human hand 60 (all hand parts are shown in FIG. 2.) FIG. 1 uses shading lines to show the walls of cavity 12 (the floor is left unshaded to avoid a cluttered appearance.) FIG. 2 and the dashed outline in FIG. 1 show how cavity 12 extends further to the right, beneath the top surface of body 10.

Returning to FIG. 1, body 10 is placed in approximately the "2 o'clock" position of steering device 31, under covering grip 33 (which is slightly larger than body 10). Covering grip 33 is connected at both ends to an approximately circular surface grip 32 of steering device 31. Covering grip 33 can be thought of as a continuation of the outer covering of surface grip 32, generally along the side of surface grip 32 that faces towards the windshield. Body 10 and covering grip 33 are in this way said to be connected "in line" with surface grip 32. Covering grip 33 can be a separate part that is glued or screwed to surface grip 32, or it can be a partial continuation of surface grip 32. A left pivoting pin 22 extending from the left end of body 10 is inserted into a left pivot hole 26 in surface grip 32 at a slanted joint 30a. A right pivoting rotator with aperture 24 extending from the right end of body 10 is inserted into a right pivot hole 28 in surface grip 32 at a slanted joint 30b. Rotator 24 is depicted as a hollow cylinder, but it can be conical or any other suitable shape that will fit into a similarly shaped pivot hole 28. Slanted joints 30a and 30b are parallel to each other. It is preferred that surface grip 32 have an elliptical cross-section (at least at joints 30a and 30b), of dimensions that make slanted joints 30a and 30b circular in shape. Surface grip 32 should also be sized in such a way that joints 30a and 30b have the same diameter as the circular ends of body 10. A pin removal slot 25 allows pivoting pin 22 to be removed from left pivot hole 26, so that my control housing can be serviced and/or replaced if desired. Note that right pivot hole 28 widens upwards, in order to allow body 10 to be bent downwards and removed. A pin screw 27 prevents pin 22 from falling out when my control housing is installed. Pin 22, rotator 24 and pivot holes 26 and 28 are all of a size adequate to minimize friction between these parts, yet they are spaced closely enough to avoid excessive rattling of body 10.

One or more signal-conducting wires 35 pass through conductor conduits 37a and 37b in body 10, then through an aperture in rotator 24. From there, wires 35 pass into right pivot hole 28 and through conductor conduit 37c which leads through surface grip 32, into a spoke 34, and finally down through a steering column 36 of steering device 31. Wires 35 are used to transmit signals from controls 14 and 16 to a number of devices that are external to my control housing (for example: brakes, cruise control, and/or throttle.) I have not bothered to give wires 35 separate numbers because they are not part of my control housing invention; rather they are part of the electronic apparatus that goes inside it.

The preferred embodiment of my control housing additionally has the features contained in the following paragraphs.

Positioning magnetized members 38a and 38b are embedded in slanted joint 30a and the left end of body 10 respectively. One of magnetized members 38a and 38b must be a magnet or an electromagnetic device; the other can be so constructed, or it can be a magnetizable material such as nickel or steel. Magnetized members 38a and 38b are aligned in such fashion that when body 10 is released by hand 60, the attraction between magnetized members 38a and 38b causes cavity 12 to rotate to a predetermined facing that reduces exposure of controls 14 and 16 to the possibility of accidental actuation. For example, this predetermined facing could be towards steering column 36, or it could face against covering grip 33.

Ideally, magnetized member 38a should be a programmable, reversible-polarity electromagnet, while magnetized member 38b is a fixed-polarity magnet. When the control housing is released, it would still automatically rotate to its hidden position; when steering device 31 returns to a level position, a special mechanism would detect this change and reverse the polarity of magnetized member 38a, forcing the control housing to reopen. While I have personally sketched a technologically workable mechanism for this ideal structure, I won't claim it as a part of my control housing now because I plan to patent it separately. I stated it here mainly to place it in the public record.

As shown in the cross-sectional end-view of FIG. 3, a sliding cover 40 can be slid over cavity 12 and back into retraction slot 46 (which is shown only by a dashed outline in FIG. 1.) This is done by sliding a cover knob 42 along a knob groove 44. Cover 40 is drawn in FIG. 3 its retracted position, with its alternate covering position shown by the dashed outlines; knob groove 44 is the blank space above this alternate position. Knob groove 44 opens down into cavity 12. A cover spring 48 lies within cavity 12 under knob groove 44. Cover spring 48 is attached between sliding cover 40 and a nearly central point on the right wall of cavity 12. This central point is displaced slightly towards the center of knob groove 44, so that spring 48 will exert its maximum force against sliding cover 40 when it is in the halfway position, causing it to slide either completely over cavity 12 or into slot 46, avoiding any partway position. The purpose of sliding cover 40 is, of course, to remove controls 14 and 16 from exposure when a driver does not wish to use them. Parts 40 through 48 can be discerned somewhat less clearly in FIG. 1, where just the thin leading edge of sliding cover 40 can be seen, and where the position of retraction slot 46 is indicated by dashed outlines The preferred arrangement of controls 14 and 16 within cavity 12 is best shown by the cross-sectional side view of FIG. 2, with FIG. 1 providing a good supplemental view. A dial control 14 is placed in cavity 12 in a place accessible to a distal phalanx 64. Control 14 rotates around a dial control pin 50 that is aligned along an axis perpendicular to the floor of cavity 12. Dial control 14 has a slanted top, which makes it more comfortable for thumb 62 to turn, and this also reduces the possibility of accidental actuation by a mistaken lateral movement of thumb 62 along the top of cavity 12. Control 14 is well suited for maintaining a scalar variable at a fixed number (a good example of such a variable is vehicular speed.) A contracting control 16 is placed in cavity 12 in a place accessible to a contracting motion of thumb 62, rotating around a contracting control pin 52 attached to one or both sides of cavity 12. As control 16 is displaced rightwards, a control spring 15 exerts increased force against control 16, so that control 16 returns to its starting position upon being released by thumb 62. Control 16 is suited for temporarily actuating a scalar vehicular variable (a good example of such a variable is vehicular braking deceleration.) A control guard 17 is positioned above control 16, curved so as to approximate the contours of thumb 62. A thumb rest 13 is shown as a shaded depression in body 10 that is contoured substantially in the shape of the left half of thumb 62.

The actual electronic design of controls 14 and 16 are well beyond the scope of my control housing. However, for the sake of clarity it should be stated that controls 14 and 16 have associated with them a sensor means for sensing the position of controls 14 and 16. This sensor means could be integrated into controls 14 and 16, or located in pins 50 and 52, or attached to pins 50 and 52 within the walls of body 10.

Operation—FIGS. 1 to 3

To operate the preferred embodiment of my control housing, a driver moves the fingers of hand 60 over covering grip 33. Palm 68 rests on body 10, which is inserted into surface grip 32 at joints 30a and 30b. Thumb 62 is now situated in proximity to cavity 12. FIG. 2 uses arrows extending downward from hand 60 to show this gripping movement. Returning to FIG. 1, when controls 14 or 16 are operated signals are sent through signal-conducting wires 35 (e.g. wires) passing through conductor conduits 37a and 37b and rotator 24, through right pivot hole 28 and then into conduit 37c which runs through spoke 34 and steering column 36. To operate dial control 14, driver touches control 14 with distal phalanx 64 and rotates dial control 14 about pin 50 in either direction, as shown by the nearby double arrows in FIG. 1. If control 14 is used to control vehicular speed as preferred by this inventor, ease of driving will be improved and foot fatigue will be eliminated.

The double arrows shown in FIG. 2 indicate the movement of contracting control 16, with its contracted position shown in dashed lines. To operate control 16, driver contracts thumb 62 so as to cause distal phalanx 64 to displace control 16 rightwards, pivoting about pin 52. As control 16 is displaced rightwards, control spring 15 exerts increased force against it, so that the position of control 16 is approximately proportional to the force exerted by distal phalanx 64. When the driver desires to cease operating control 16, the driver withdraws distal phalanx 64 until it is no longer is in contact with control 16, whereupon control 16 is returned to its non-displaced starting position by the force exerted by control spring 15. Should control 16 be used to control vehicular braking as I would prefer, improved braking reaction time will avoid many accidents and reduce the destructiveness of those accidents that do occur, potentially saving thousands of lives.

Control guard 17 positioned beneath proximal phalanx 66 inhibits unintentional actuation of control 16. Whenever the driver turns steering device 31 clockwise, thumb 62 will have a natural tendency to slide deeper into cavity 12: the curvature of control guard 17 will then inhibit thumb 62 from unintentionally slipping down to actuate control 16, and in fact thumb 62 will instead tend to slide into curved control guard 17. And whenever distal phalanx 64 contracts against control 16, the straight lower section of control guard 17 serves as a resting place for the bottom of proximal phalanx 66. Thumb rest 13 allows the left half of thumb 62 to rest, and reduces the possibility of accident actuation of controls. Thumb rest 13 should curve downwards at its edge with cavity 12, so that thumb 62 can comfortably slide over and down into cavity 12.

As the driver steers the vehicle, the angle between hand 60 and the plane of surface grip 32 will tend to change. When making a left turn using a steering device 31, thumb 62 normally moves towards the top of surface grip 32; turning right, it normally moves towards the inner surface of surface grip 32. As this angle changes, body 10 rotates around the axis between pivoting pin 22 and rotator 24, which turn inside two pivot holes 26 and 28 inside parallel slanted joints 30a and 30b of surface grip 32. The double arrows shown in FIG. 1 near rotator 24 indicate the movement of this rotation. The rotation of body 10 confers the advantage of allowing the driver's thumb 62 to remain inside cavity 12 for a longer time than would otherwise be possible; without rotation, thumb 62 could become jammed inside cavity 12. Optimally, the steering ratio of steering device 31 should be calibrated to require minimal rotation to turn the vehicle, so that thumb 62 can remain in proximity to controls 14 and 16 more often. If the steering ratio is engineered optimally, paraplegics who do not have the use of their legs will be able to drive any vehicle that utilizes my control housing. Covering grip 33 is located on the side opposite from the driver, which allows thumb 62 to remain in cavity 12 as body 10 rotates. The flexible nature of the plastic used in covering grip 33 should ensure that thumb 62 is not hurt if a sudden rotation of body 10 brings thumb 62 into contact with covering grip 33.

When driver releases body 10, magnetized members 38a and 38b attract each other so that cavity 12 is rotated to a position that reduces exposure of controls 14 and 16 to the possibility of accidental actuation. In the course of sharp turns, the driver can be expected to alternately grip and release surface grip 32 at several points along its circumference. If during this time hand 60 happens to grip covering grip 33, the fixed non-rotating nature of covering grip 33 will ensure that hand 60 will experience no rotational slippage. Furthermore the flexible nature of the plastic used in covering grip 33 will create friction between body 10 and covering grip 33 when hand 60 grips it, inhibiting the rotation of body 10. The driver can increase or decrease this rotational friction at will, simply by varying the downward pressure of hand 60 on covering grip 33. Obviously, covering grip 33 should not be so flexible that this frictional force makes it too hard to turn body 10.

The double arrows shown in FIG. 3 indicate the movement of sliding cover 40. To protect controls 14 and 16 from exposure, sliding cover 40 can be slid by driver over cavity 12, by sliding cover knob 42 along knob groove 44, so that cover 40 is moved out from retraction slot 46 and over cavity 12. Cover spring 48 is attached between body 10 and cover 40 in a generally central position, and moves along with cover 40. Spring 48 is positioned to exert greater force against cover 40 when it is halfway along its sliding movement, causing cover 40 to slide either over cavity 12 or into retraction slot 46, avoiding any partway position. Strictly speaking, spring 48 isn't necessarily in the plane of the cross-section, but its general position is shown to facilitate understanding of my invention.

Returning to FIG. 1 now, to remove the control housing from steering device 31 for servicing, pin screw 27 is unscrewed and pivoting pin 22 is withdrawn from covering grip 33 through pin removal slot 25. To reinsert the control housing into covering grip 33, rotator 24 is inserted into right pivot hole 28, then pin 22 is inserted into left pivot hole 26 through pin removal slot 25, and finally pin screw 27 is inserted to keep pin 22 from falling out.

Description of Alternative Embodiment—FIG. 4

A smaller alternative embodiment is disclosed in FIG. 4. Where a part is exactly the same in both FIG. 1 and FIG. 4, their part numbers are the same; where there is even a slight difference, the convention I follow is to add an "s" to the number, e.g. body 10 becomes body 10s. If a part's first mention is in this paragraph, I give it a separate number of its own. The differences between this embodiment and the previously described embodiment are as follows. The shape and size of body 10s and cavity 12s are different, while remaining generally elongated and capable of accommodating movement by thumb 62. Body 10s is shorter and has ergonomic grooves 11 to allow easy grip by hand 60. Cavity 12s is also shorter, about five centimeters long and three centimeters wide. The smaller dimensions allow a smaller circumference of body 10s, which makes it easier to grip, but this leaves less room for controls 14s, 16s and 56 and exposes them a bit more. Surface grip 32s does not have a completely closed circumference (it is more like a handle of an airplane's steering device). Rotator 24s projects outward from surface grip 32s into a right pivot hole 28s in body 10s, rather than projecting out from body 10 of FIG. 1. Covering grip 33s is grooved so that it can accommodate the rotation of grooved body 10s; it is preferred that all grooves be well rounded so that hand 60 can slide with reasonable comfort from surface grip 32s onto covering grip 33s. Covering grip 33s can be unscrewed from surface grip 32s at a covering grip screw 58 located on the back side of covering grip 33s, allowing removal of body 10s straight out from rotator 24s. Parts not present are pivoting pin 22, slot 25, screw 27, left pivot hole 26, thumb rest 13 and conductor conduit 37a. Sliding cover parts 40 through 48 are also not present; instead, there is a positioning lock 54 at joint 30b, and a positioning lock groove 55 in body 10s. Magnetized member 38b embedded into body 10 remains, but magnetized member 38a is replaced by another type of magnetized member: a positioning iron arc 39, which increasingly thickens in the direction of the predetermined starting position of my control housing. Dial control 14s rotates about dial pin 50s on the same axis as body 10s, instead of rotating about an axis perpendicular to the floor of cavity 12s. Control 16s is of a unidirectional-movement type that is displaced by distal phalanx 64 into a control slot 19, which is of a shape adequate to accommodate control 16s as it is displaced rightwards. Control spring 15s provides force feedback for control 16s. An additional button control 56 is shown that can be used to control another automotive function (one example would be a cruise-control button.) In other respects, this alternative embodiment is like that of the preferred embodiment.

Operation of Alternative Embodiment—FIG. 4

The operation of the alternative embodiment is very similar to the operation of the preferred embodiment, so I will here discuss only those respects in which the operation of the alternative embodiment differs from the operation of the preferred embodiment.

The curved double arrows indicate the operation of dial control 14s in the alternative embodiment. The bottom surface of distal phalanx 64 moves over dial control 14s and then moves dial control 14s from side to side; in the preferred embodiment, distal phalanx 64 must dip a little further into cavity 12s and then moves dial control 14s from side to side. The preferred embodiment has the advantage of less exposure to accidental actuation by any unintended contact with thumb 62.

The straight double arrows shown in FIG. 4 indicate the operation of contracting control 16s in the alternative embodiment Distal phalanx 64 pushes control 16s rightwards along a straight axis into control slot 19 (the contracted position is shown in dashed lines); in the preferred embodiment, when thumb 62 displaces control 16 rightwards, distal phalanx 64 rotates upwards around its joint with its proximal phalanx 66. The preferred embodiment has the advantage of being more ergonomically aligned with the natural tendency of distal phalanx 64 to rotate as thumb 62 is contracted.

To keep cavity 12s locked under covering grip 33s, a driver first releases body 10s and waits for magnet 38b and iron arc 39 to align, which causes cavity 12s to face covering grip 33s. Then the driver slides lock 54 into groove 55 (the locking position of lock 54 is shown in dashed lines.) This method is simpler than the sliding cover 40 used in the previously discussed embodiment, and may well be better.

An additional button control 56 can be operated by simply pushing it down. One possible purpose of this control could be to initiate cruise control mode. The actual electronic configuration and wiring of controls such as control 56 is beyond the scope of my control housing invention.

In other respects, the operation of this alternative embodiment is like that of the preferred embodiment.

Conclusions, Ramifications and Scope

Accordingly, the reader can see that controls placed within my control housing are more easily and quickly operated than are foot-operated controls and other known hand-operated controls. Usage of my control housing will avoid many accidents and reduce the destructiveness of those accidents that still occur, potentially saving thousands of lives. My control housing also will lessen foot fatigue for drivers, and could be a boon for paraplegics. All of this is accomplished by a thumb control housing that allows controls to be operated by quick thumb movements, without exposing these controls to an excessive chance of accidental actuation. I know of no prior art that provides such a beneficial arrangement of controls on a steering device.

Although the description I have given contains several specifications, these should not be construed as limiting the scope of the invention, but as merely providing illustrations of some of the presently preferred embodiments of this invention. For example, the body and its cavity can have different shapes and dimensions, as long as sufficient comfort, grip and range of movement is provided for the driver's hand and thumb; the body does not have to be strictly rounded but can be extended and/or reduced in one or more places; in particular, it may be desirable to give the body contours that maximize ergonomic comfort for the human palm; various materials can be used, including but not limited to plastic, ceramic and wood; the body can rotate about differently sized pins, cones, cylinders, and other rotating shapes; these rotating shapes can protrude from the steering device into holes in the housing body, or vice versa I like to use the phrase "substantially rounded" to describe the body, by which I mean that it's rounded enough allow a hand to slip over it comfortably, whether it's sliding around the circumference of the steering wheel, or sliding over it from the direction of the driver. I like to use the phrase "substantially rounded" to describe the body, by which I mean that it's rounded enough allow a hand to slip over it comfortably, whether it's sliding around the circumference of the steering wheel, or sliding over it from the direction of the driver.

Myriad combinations of controls can be placed inside the housing; controls can have different shapes and sizes and modes of operation; controls may or may not provide force feedback; force feedback may be provided by means other than springs and other elastic mechanisms, including but not limited to a pressure sensor mechanism; controls may be variable in their placement in accordance with the size of the driver's hand and thumb; various methods can be used to insert and retain the housing in the steering device; controls can send various types of signals, including but not limited to electrical, optical, and/or hydraulic signals; devices other than brakes, throttles and cruise controls can be operated; and the control guard can be of various shapes that are suitable for diverting a human thumb from the bottom of the cavity.

Various magnetic, spring-wound and elastic methods can be used to cause the cavity to change facing when the body is released; the sliding cover and/or other nonessential parts can be omitted; the sliding cover can be slid in various directions; and the sliding cover can be retained in a set position by various mechanisms.

Various types of rotating steering devices can accommodate my control housing, such as steering wheels and flight controls; if a steering device has multiple surface grips, my control housing can be placed on any of these surface grips; the covering grip may be made of different materials, it may be shaped in various ways or joined to the surface grip by various methods, or it may not be utilized at all; various types of position locking mechanisms may be present, or may be omitted; signal-conducting wires can be configured in various combinations and directions; signal-conducting wires can pass through the body through apertures of various sizes and shapes; and conductor conduits can be of any shape or size suitable for signal-conducting wires.

Also, while the illustrations of the preferred embodiment show a housing that is usable by the right hand, housings for the left hand can be designed. However, the right-handed housing is preferred for brake controls because it provides better safety. This is because (a) when a driver makes a left turn, the right-handed thumb can remain over the wheel longer than the left hand can and (b) there is a greater possibility of an accident when left-handed turns are made, because of the oncoming traffic in the opposite lane. Furthermore most people are right-handed. But an argument can be made for the left hand as well, because it stays on the steering wheel more often (the right hand occasionally is withdrawn by the driver to adjust the dashboard controls.) I feel that having two of my inventions on one steering wheel may be difficult for drivers to adjust to, and might make it too difficult to control the wheel.

Thus the scope of the invention should be determined by the appended claims and their legal equivalents, rather than by the examples given.

I claim:

1. A rotating control housing located on a steering wheel for a motor vehicle, comprising:
    (a) a body, to be situated in an approximately circular surface grip of a steering wheel;
    (b) a cavity in said body, with adequate space in said cavity for placement of at least one control, the actuating surface of said control being predominantly contained within said cavity;
    (c) at least one joining means for joining said body to said surface grip, said joining means allowing rotation of said body around an axis between said surface grip and said body through said at least one joining means, with said body interposed between abutments of said surface grip;
    (d) a conductor conduit in said body through which a signal-conducting wire can pass from said body;
   whereby said at least one control can transmit signals into said steering wheel.

2. The rotating control housing of claim 1, further including a rotating dial control in said cavity, the actuating surface of said dial control being predominantly contained within said cavity.

3. The rotating control housing of claim 1, further including a contracting control in said cavity, the actuating surface of said contracting control being predominantly contained within said cavity.

4. The rotating control housing of claim 1, further including a control guard extending into said cavity.

5. The rotating control housing of claim 1, further including a positioning means utilizing a first magnetized member in said body and a nearby second magnetized member in said surface grip, by which said body rotates to a predetermined position when released.

6. The rotating control housing of claim 1, wherein said steering wheel has a section omitted, replacing its circular shape with a broadly arcing shape.

7. The rotating control housing of claim 1, wherein said joining means utilizes a rotator member.

8. The rotating control housing of claim 7, wherein said rotator member has an aperture through which signal-conducting wires can pass.

9. The rotating control housing of claim 1, further including a covering grip attached to said surface grip, said covering grip partially covering the surface of said body.

10. The rotating control housing of claim 9, further including a position lock to secure said cavity under said covering grip.

11. A rotating control housing located on the surface grip of a steering wheel for a motor vehicle, comprising:

(a) a body having a cavity, with sufficient room in said cavity for at least one control, the actuating surface of said control being predominantly contained within said cavity;

(b) at least one joint where said body abuts a rotating steering wheel having a surface grip, said joint allowing rotation of said body around an axis between said surface grip and said body at said at least one joint, and with said body interposed between abutments of said surface grip;

(c) an aperture in said body through which a signal-conducting wire can pass from said at least one control to said surface grip;

whereby said at least one control can transmit signals into said steering wheel.

12. The rotating control housing of claim 11, further including a rotating dial control in said cavity, the actuating surface of said dial control being predominantly contained within said cavity.

13. The rotating control housing of claim 11, further including a contracting control in said cavity, the actuating surface of said contracting control being predominantly contained within said cavity.

14. The rotating control housing of claim 11, further including a control guard extending into said cavity.

15. The rotating control housing of claim 11, further including a positioning means utilizing a first magnetized member in said body and a nearby second magnetized member in said surface grip, by which said body rotates to a predetermined position when released.

16. The rotating control housing of claim 11, wherein said steering wheel has a section omitted, replacing its circular shape with a broadly arcing shape.

17. The rotating control housing of claim 11, wherein said joining means utilizes a rotator member.

18. The rotating control housing of claim 17, wherein said rotator member has an aperture through which signal-conducting wires can pass.

19. The rotating control housing of claim 11, further including a covering grip attached to said surface grip, said covering grip partially covering the surface of said body.

20. The rotating control housing of claim 19, further including a position lock to secure said cavity under said covering grip.

* * * * *